US007315857B2

(12) United States Patent
Dettinger et al.

(10) Patent No.: US 7,315,857 B2
(45) Date of Patent: Jan. 1, 2008

(54) METHOD AND SYSTEM FOR PROPAGATING ANNOTATIONS USING PATTERN MATCHING

(75) Inventors: Richard D. Dettinger, Rochester, MN (US); Cale T. Rath, Byron, MN (US)

(73) Assignee: International Business Machines Corporation, Armonk, NY (US)

( * ) Notice: Subject to any disclaimer, the term of this patent is extended or adjusted under 35 U.S.C. 154(b) by 476 days.

(21) Appl. No.: 10/845,501

(22) Filed: May 13, 2004

(65) Prior Publication Data
US 2005/0262051 A1    Nov. 24, 2005

(51) Int. Cl.
G06F 17/30    (2006.01)
(52) U.S. Cl. .................. 707/6; 707/5; 707/102; 707/103 R
(58) Field of Classification Search ............ 707/2–6, 707/104.1, 1, 100, 102, 103 R–103 Z; 709/201, 709/220, 223; 704/10; 715/532
See application file for complete search history.

(56) References Cited

U.S. PATENT DOCUMENTS

| | | | | |
|---|---|---|---|---|
| 6,549,922 | B1 * | 4/2003 | Srivastava et al. | 707/205 |
| 7,013,307 | B2 * | 3/2006 | Bays et al. | 707/102 |
| 2001/0051958 | A1 * | 12/2001 | deVries et al. | 707/511 |
| 2004/0261016 | A1 * | 12/2004 | Glass et al. | 715/512 |
| 2005/0256867 | A1 * | 11/2005 | Walther et al. | 707/5 |

OTHER PUBLICATIONS

Dettinger et al., IBM U.S. Appl. No. 10/691,415 (ROC920030261US1), filed Oct. 22, 2003. "Context Sensitive Term Expansion With Dynamic Term Expansion".
Dettinger et al., IBM U.S. Appl. No. 10/691,308 (ROC920030320US1), filed Oct. 22, 2003, "Context Sensitive Term Expansion With Multiple Levels of Expansion".

* cited by examiner

*Primary Examiner*—John Cottingham
*Assistant Examiner*—Cheryl Lewis
(74) *Attorney, Agent, or Firm*—Patterson & Sheridan, LLP (57) ABSTRACT

Methods, systems, and articles of manufacture for propagating annotations created for data objects appearing in a variety of different application types are provided. Some embodiments present users collaborating on a project with an indication of data objects in a current document that have been annotated, or that related data objects have been annotated, in other documents. Users may then review the annotations and selectively associate the annotations with the related data object in the current document, thereby spreading the tacit knowledge reflected in the annotation about related data objects across many documents in an enterprise network. Further, an annotation management system may maintain a thesaurus of related terms and corresponding annotation points to find annotations for data objects that exist in other documents without having to inspect the data object(s) associated with each existing annotation.

5 Claims, 6 Drawing Sheets

METHOD AND SYSTEM FOR PROPAGATING ANNOTATIONS USING PATTERN MATCHING

CROSS-REFERENCE TO RELATED APPLICATIONS

The present invention is related to the commonly owned, co-pending U.S. patent applications entitled "Method and System for Viewing Annotations Across Multiple Applications," filed herewith, U.S. Ser. No. 10/691,415, filed Oct. 22, 2003 entitled "Context Sensitive Term Expansion With Dynamic Term Expansion" and U.S. Ser. No. 10/691,308, filed Oct. 22, 2003 entitled "Context Sensitive Term Expansion with Multiple Levels of Expansion", which are all incorporated herein by reference.

BACKGROUND OF THE INVENTION

1. Field of the Invention

The present invention relates to the field of data entry and retrieval and, more particularly, to a method and system for selecting annotations created for a data object in a first data source for review and association with the same, or related, data object in other data sources.

2. Description of the Related Art

There are well known methods for capturing and storing explicit knowledge as data, for example, in relational databases, documents, flat files, and various proprietary formats in binary files. Often, such data is analyzed by various parties (e.g., experts, technicians, managers, etc.), resulting in rich interpretive information commonly referred to as tacit knowledge. Such tacit knowledge, however, is often only temporarily captured, for example, as cryptic notes in a lab notebook, discussions/conversations, presentations, instant messaging exchanges, e-mails and the like. Because this tacit knowledge is typically not captured in the application environment in which the related data is viewed and analyzed, it is often lost. Moreover, even when tacit knowledge is captured for information contained within one application environment, it is often relevant to the same or related information in others. Because it is only linked to the information in the original application, however, it is unavailable in the second, even though relevant and useful.

One approach for more permanently capturing tacit knowledge is to create annotations containing descriptive information about data objects. Virtually any identifiable type of object may be annotated, including, a matrix of data (e.g., a spreadsheet or database table), a text document, or an image. Further, sub-portions of objects (sub-objects) may be annotated, such as a cell, row or column in a database table or a section, paragraph or word in a text document. Typically, an indexing scheme is used to create an index mapping each annotation to the annotated data object or sub-object, based on identifying information. The index should provide enough specificity to allow the indexing scheme to locate the annotated data object (or sub object). Further, the indexing scheme should work both ways to be effective: that is, given an index, the scheme will locate a corresponding data object, and given an object, the scheme will calculate the index values for use in classification, comparison and searching (e.g., to search for annotations for a given data object).

Current annotation systems, however, typically only create and index annotations for the data object occurring in the application for which the annotation was created. Accordingly, the usefulness of the annotation, and the tacit knowledge it captures, is limited to the application environment in which the annotation is initially created. This limitation is especially problematic when the same, or related, data object appears in multiple data sources across an enterprise environment. For example, an annotation to a particular patient record regarding an individual's medications or allergies would be useful in any patient record for the same individual, but unavailable so long as the annotation is only linked with the original data object for which it was created.

This limitation is also apparent if one considers, for example, two research papers published about a DNA mutation. If a researcher annotates various data objects in the first paper, current systems cannot provide access to annotations from the first paper to researchers reviewing the second paper, despite being relevant to concepts and elements discussed in both. In other words, the tacit knowledge captured by annotations is unnecessarily confined to one application instead of being available for association with the same concept reflected by the data object in other applications.

Accordingly, there is a need for improved methods and systems for sharing the tacit knowledge captured by annotations. Preferably, the methods and systems will allow annotations created for data objects within one document to be propagated to the same, or related, data objects in other document. Doing so allows annotations to become associated more generally with a concept or particular piece of information rather than being limited to the document containing the data object for which the annotation was created.

SUMMARY OF THE INVENTION

The present invention is generally directed to methods, systems, and articles of manufacture for finding annotations created for data objects in one document that are the same, or related, to data objects in a another document.

One embodiment provides a method of propagating annotations among related data objects present in discrete data sources available on an enterprise network running an annotation system. The method generally includes, receiving a request to find annotations related to data objects in a first data source, identifying a plurality of candidate data objects contained in the first data source, identifying a set of annotations created for the candidate data objects in other data sources, and providing an indication of which candidate data objects have annotations that have been created in other data sources.

Another embodiment provides a system for propagating annotations among related data objects present in discrete data sources in a network. The system generally includes an application that allows a user to access a document, an annotation store containing annotations corresponding to data objects contained in a variety of data sources, and a pattern matching engine configured to identify annotations created for data objects contained in other documents that are related to data objects contained in the document accessed by the application.

Another embodiment provides a computer-readable medium containing an executable component for propagating annotations among related data objects present in discrete data sources. When executed by a processor, the executable component performs operations generally including receiving a request to find annotations related to data objects in a first data source, identifying a plurality of candidate data objects within a first data source, selecting a set of annotations created for each candidate data object in other data sources, and selectively associating individual annotations with the corresponding candidate data objects in the first data source.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

Note, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

The present invention provides methods, systems, and articles of manufacture that may be used to propagate and extend annotations made for a variety of different types of data objects manipulated by a variety of different types of applications. Some embodiments allow users collaborating on a project to propagate annotations created for a data object present in one data source to the same, or related, data object in other data sources. Doing so may facilitate and encourage users to capture and share tacit knowledge across many applications or occurrences of the data object. Additionally, annotations may be stored separately from the application data they describe, decoupling the tacit knowledge captured in the annotations from the applications used to manipulate the annotated data, thereby allowing the annotations to be repeatedly associated with additional data sources that contain the same, or related, data object.

As used herein, the term annotation generally refers to any type of descriptive information associated with one or more data objects. Annotations may exist in various forms, including textual annotations. (descriptions, revisions, clarifications, comments, instructions, etc.), graphical annotations (pictures, symbols, etc.) or sound clips, etc. While an annotation may exist in any or all of these forms, to facilitate understanding, embodiments of the present invention may be described below with reference to textual annotations as a particular, but not limiting, example of an annotation. Accordingly, the following techniques described with reference to textual annotations may also be applied to other types of annotations as well, and more generally, to any type of reference to a data object. As used herein, the term document generally refers to any type of content containing data source including, but not limited to, text documents, database records, database tables, spreadsheets, schematics, images, media files, and the like. While a document may be any of these, to facilitate understanding, embodiments of the present invention may be described with reference to text documents as a specific, but not limiting example of a document.

Additionally, as used herein, the term user generally applies to any entity using the system or techniques described herein, including, both a person (e.g., an individual) interacting with an application program or an application program itself performing automated tasks. While the following description often refers to a graphical user interface (GUI) intended to present information to and receive information from a person, it should be understood that in many cases, the same functionality may be provided through a non-graphical user interface, such as a command line and, further, similar information may be exchanged with a non-person user via a programming interface.

One embodiment of the invention is implemented as a program product for use with a computer system such as, for example, the enterprise system 100 shown in FIG. 1 and described below. The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications. The latter embodiment specifically includes information downloaded from the internet and other networks. Such signal-bearing media represent embodiments of the present invention when carrying computer-readable instructions that direct the functions of the present invention.

In general, the routines executed to implement the embodiments of the invention, may be part of an operating system or a specific application, component, program, module, object, or sequence of instructions. The software of the present invention typically is comprised of a multitude of instructions that will be translated by the native computer into a machine-readable format and hence executable instructions. Software programs are also comprised of variables and data structures that either reside locally to the program or are found in memory or on storage devices. In addition, various programs described hereinafter may be identified based upon the application for which they are implemented in a specific embodiment of the invention. Those skilled in the art, however, will appreciate that any particular nomenclature that follows is used merely for convenience, and accordingly, does not limit the present invention to use solely in any specific application identified and/or implied by such nomenclature.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and, unless explicitly present, are not considered elements or limitations of the appended claims.

Embodiments of the present invention may be implemented in a hardware/software configuration including at least one networked client computer and at least one server computer, although the client-server model is merely illustrative, and not limiting of the invention. Furthermore, embodiments of the present invention apply to any comparable hardware configuration, regardless of whether the computer systems are complicated, multi-user computing apparatuses, single-user workstations, or network appliances that do not have non-volatile storage of their own.

An Exemplary Environment

Figure 1:
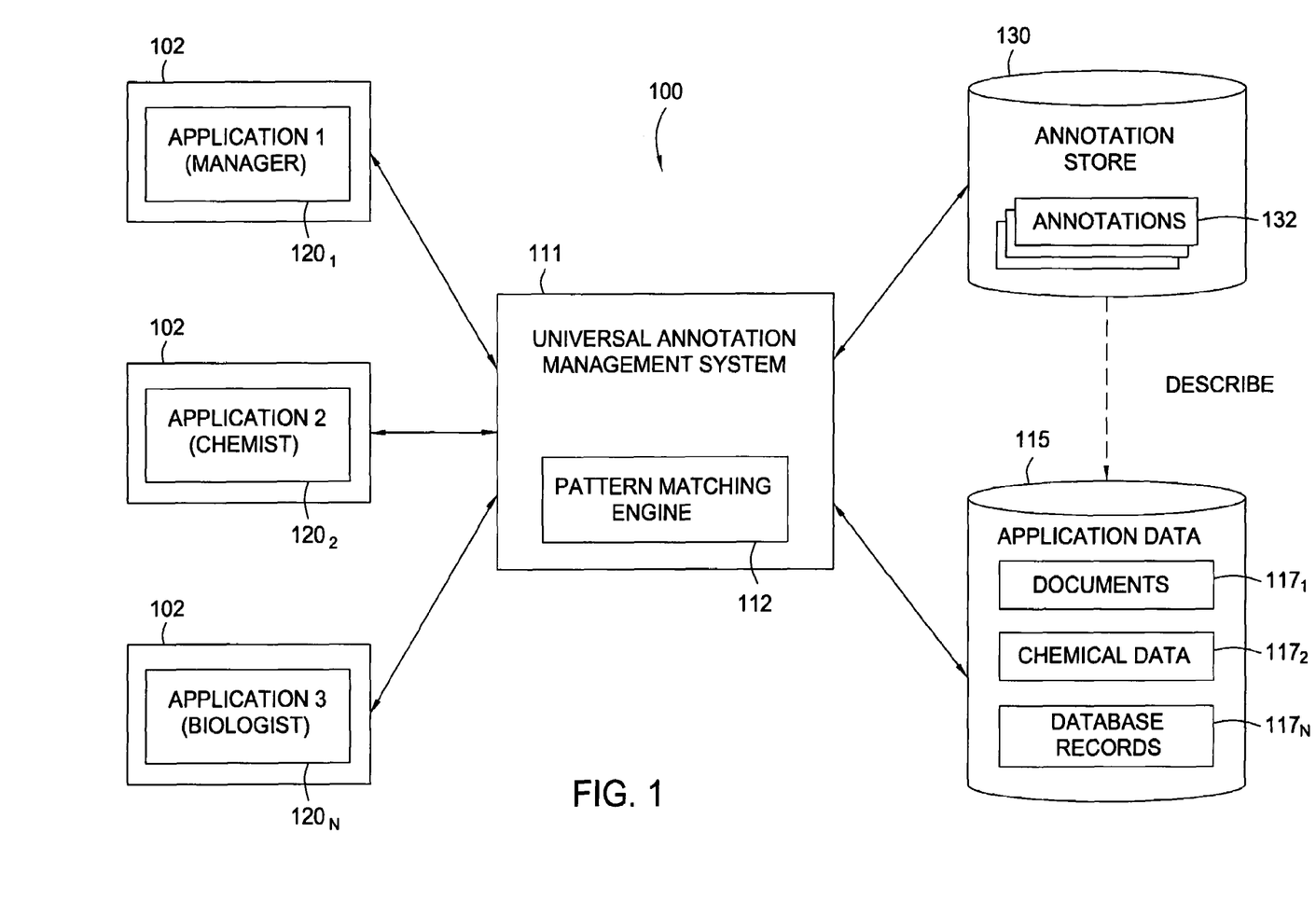
FIG. 1 illustrates is an exemplary computing environment in which embodiments of the present invention may be used.

FIG. 1 illustrates an exemplary enterprise system 100 including a universal annotation management system 111 configured to include, in part, pattern matching engine 112 that may be used to exchange information captured in the form of annotations 132, between users collaborating on a project, in accordance with the present invention. The universal annotation system 111 may be provided to enterprise users, for example, from a service provider in the business of installing such systems. In an effort to ensure successful deployment of the annotation system, the service provider may address both the capture and harvest (retrieval) of tacit knowledge in the form of annotations 132. The capture process generally involves users (e.g., people or, in some cases, application programs) entering annotation content about some item of "target" data. Once captured, the present invention allows users to propagate annotations existing for an item of "target" data to the same, or related, "target" data across multiple data sources.

"Target" data may include textual or tabular data (structured, usually non-textual), graphical data, audio data or any other type of data maintained in a data source such as a word processor document, database, spreadsheet, flow diagram, schematic (e.g., electrical or mechanical) or other storage medium. Although data sources may comprise any of the of these forms, embodiments of the present invention may be described below using text documents as a particular, but not limiting, example of a data source.

During the capture process, users typically enter annotation content by interacting with software that may be embedded within their particular applications (e.g., as a plug-in component) or, alternatively, with a separate annotation application that is external to their applications, for example, a stand-alone browser. The annotations 132 may be stored in a central annotation repository (e.g., an annotation store 130), which may be searched either independently or in conjunction with the annotated data. For example, the annotations 132 may capture insights of different users working in a biomedical enterprise, such as a manager, chemist, and biologist, each connected to the annotation system 111 using client computers 102.

Annotations 132 may include annotations describing various data objects contained in various data sources, such as documents $117_1$ (e.g., project status reports) generated by the manager with a first application $120_1$ (e.g., a word processor), chemical data $117_2$ manipulated (e.g., created/viewed/edited) by the chemist with a second application $120_2$ (e.g., a database application), and biological data $117_N$ (e.g., genomic data) generated by a biologist with an $N^{th}$ application $120_N$ (e.g., a database application or specialized genomic data application). Each data source $117_{1-N}$, may include, or make reference to, the same, or related, data object. For example, each data source 117 might describe a particular patient or a particular gene mutation.

As described below in greater detail, the annotation system 111 may be integrated with the rest of the enterprise system 100 through an independent annotation browser and plug-in components communicating with a central annotation server, allowing annotations to be manipulated from the same applications 120 used throughout the enterprise to manipulate the annotated data. Thus, the annotation system 111 provides a means for capturing and sharing tacit knowledge that can be analyzed and used in connection with the existing processes, in a wide variety of industries. The annotation system may be further configured to include a pattern matching engine 112, used by the applications to propagate knowledge captured in annotations for a particular data object about the same, or related, data objects across multiple data sources.

Figure 2:
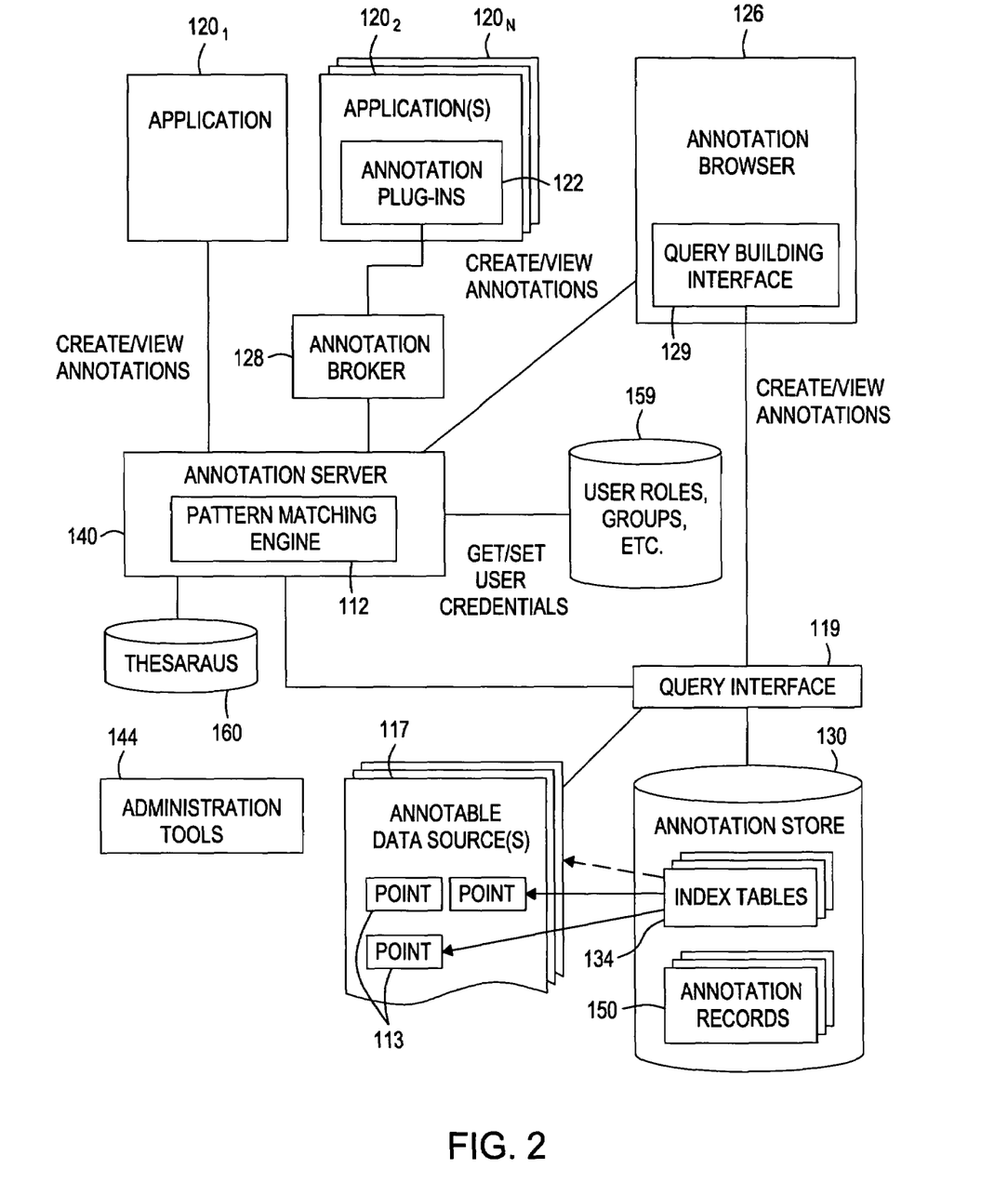
FIG. 2 is a relational view of an annotation system, according to one embodiment of the present invention.

FIG. 2 illustrates a relational view of components of the annotation system 111 including an annotation server 140, according to one embodiment of the present invention. One or more applications 120 (e.g., residing on one or more client computers 102) may communicate with the annotation server 140 either directly (e.g., application $120_1$) or via the annotation plug-ins 122 and/or annotation broker 128 (e.g., applications $120_2$-$120_N$), to create or view annotations for data object manipulated by the applications 120. Annotation broker 128 may serve as an interface between annotation plug-ins 122 for multiple applications and the annotation server 140. For example, the annotation broker 128 may manage messages sent to and from multiple applications plug-ins and the annotation server. As illustrated, the annotation server 140 may issue queries against the annotation store 130 via a query interface 119.

As illustrated, an annotation browser 126 may allow users to create and view annotations independently of any of the applications 120. For some embodiments, the annotation browser 126 may provide a generalized web-based user interface for viewing structured data content (e.g. application source data that can be accessed directly through queries via the query interface 119), and for creating and viewing annotations on structured data content. The annotation browser may provide an interface allowing a user to simultaneously query multiple data sources for annotations 132 that exist for a particular data object in a data source under consideration and associate any annotations found for matching data objects in the other data sources.

For some embodiments, an index, or set of indexes, may be stored with the annotation records and used to identify the data object(s) corresponding to each annotation. As illustrated, an index obtained from an annotation record may be used to retrieve information from one or more index tables 134 that may be used to identify the annotated data object or sub-objects, commonly referred to as annotated points 113.

As used herein, the term point may generally refer to any identifiable data unit (or group of data units) capable of being annotated. Each point defines the location, or position, within a data source of the data object associated an annotation. Examples of annotatable points include, but are not limited to, database tables, rows, columns, cells, or groups of cells, selected portions of a text document (e.g., defined by an offset and length, start and stop locations, or any other suitable defining information), and the like. Multiple points in an object may be referenced by the same annotation and any point in an object may be referenced by multiple annotations. Further, as the dashed arrow from the index table 134 in FIG. 2 indicates, an annotation may reference points in more than one annotatable data source 117.

Upon retrieving an annotation record 150 from the annotation store, using the index stored therein, the object described by the annotation can be found from the information within the annotation record, and conversely, annotations for a given object can be found in the annotation store, based on an index generated from its identifying information.

As described above, the data object associated with an annotation may be located using the index created for that annotation. In addition, the annotation server 140 may be configured to parse the explicit information in a data object to determine a set of key terms, or other identifying parameters, and store them in an annotation thesaurus 160. Thus, the annotation thesaurus 160 may contain a collection of key terms (and for some embodiments terms related to key terms). For some embodiments, each entry in the annotation thesaurus 160 may also include a reference to annotation points wherein the data object associated with the point contains the key term listed in the thesaurus. Thus, the annotation server 140 may use the annotation thesaurus 160 to efficiently find annotations that reference a data object based upon the content of the data object.

Identifying Matching Annotated Data Objects

Figure 3:
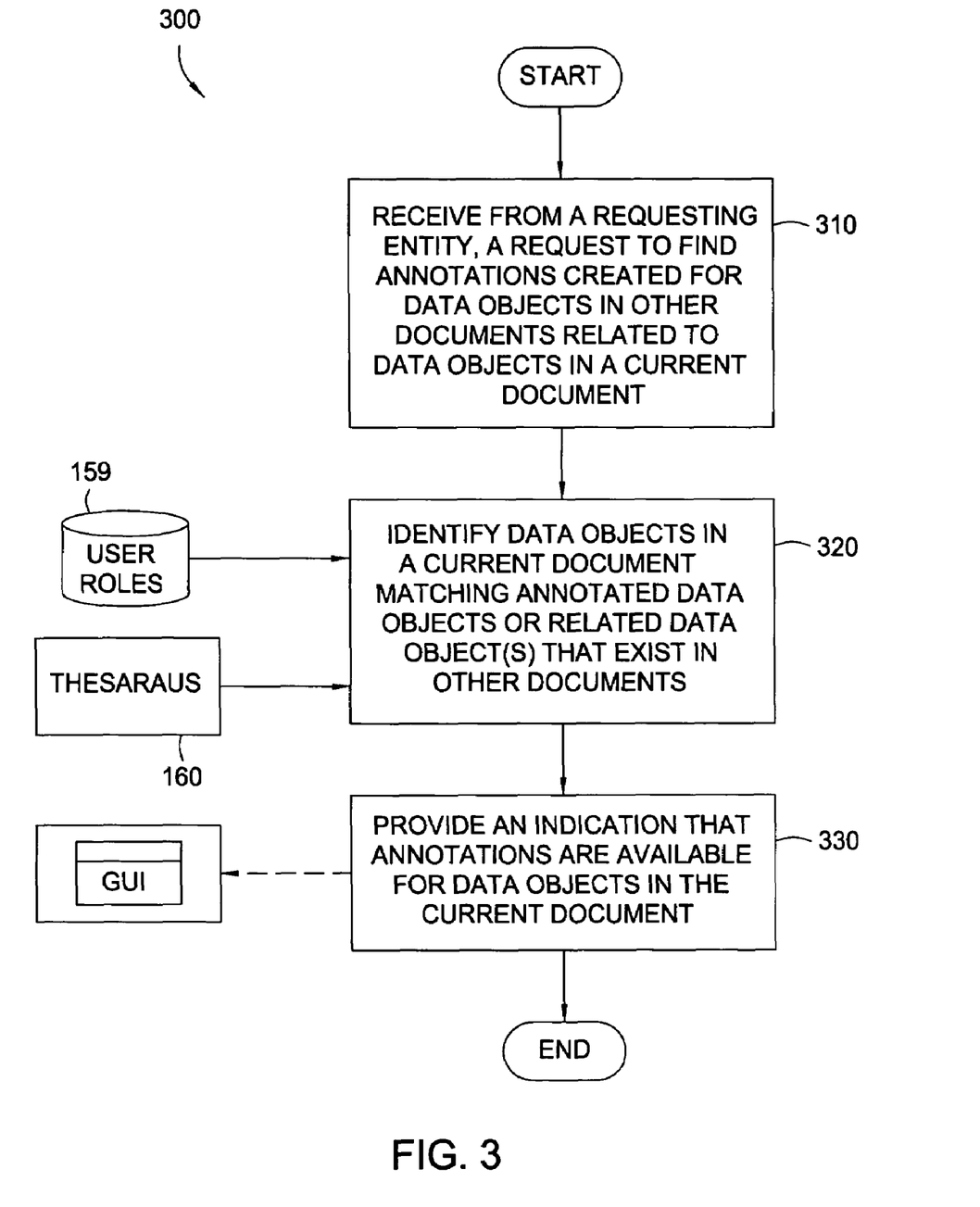
FIG. 3 is a flow chart illustrating exemplary operations for selecting a set of annotations, according to one embodiment of the present invention.
Figure 4:
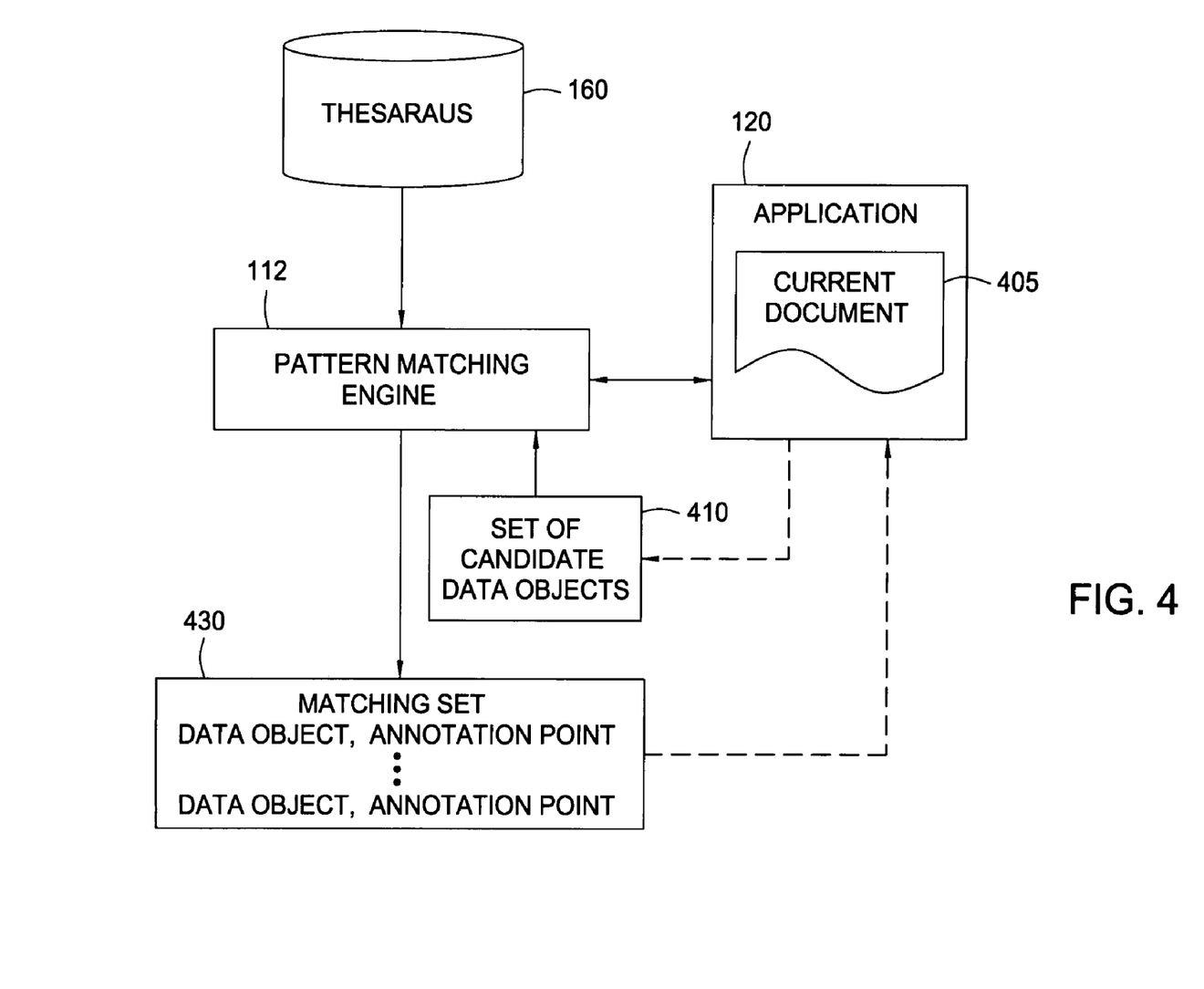
FIG. 4 is a relational view of pattern matching components of an annotation management system, according to one embodiment of the present invention.

FIG. 3 is a flow diagram of exemplary operations 300 that may be performed, for example, to provide a user running an application 120 on a client computer 102 connected to the annotation system 111, an indication of data objects present in a current document that have been annotated in other documents. Similarly, FIG. 4 illustrates a relational view of an exemplary system that may be configured to perform operations 300 shown in FIG. 3.

Figure 5:
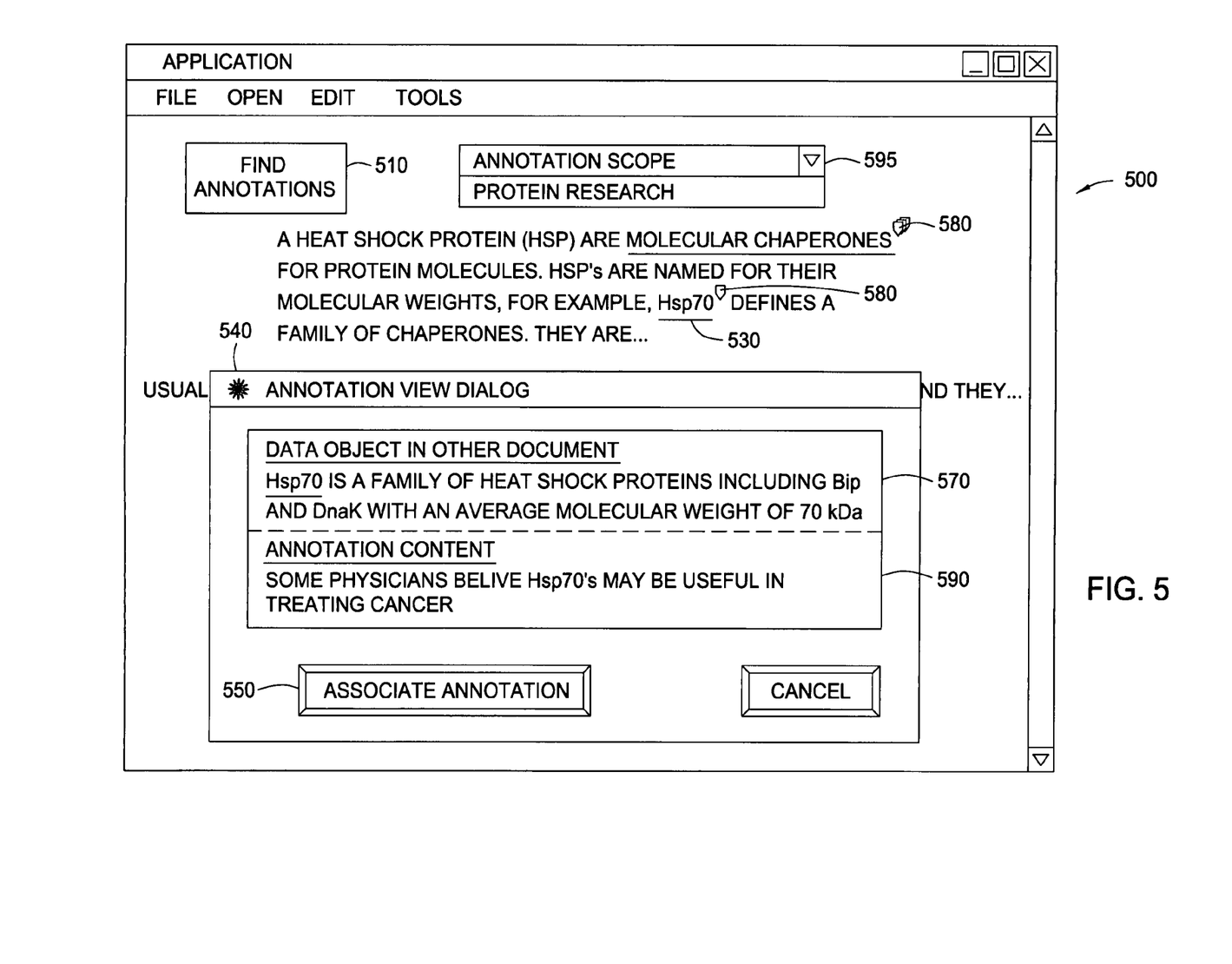
FIG. 5 is an illustration of an exemplary graphical user interface (GUI) screen, according to one embodiment of the present invention.

FIG. 5 illustrates an exemplary GUI screen that may be presented to a user to indicate that annotations exist for data objects in the current document and to allow users to selectively associate matching annotations from the set with corresponding data objects in a current document 405.

Operations 300 begin at step 310, by receiving, from a requesting entity (e.g., an individual user or application), a request to find annotations created for data objects in other documents related to data objects in the current document 405. For example, a researcher viewing an article about a particular gene mutation may wish to view annotations regarding elements or aspects of the mutation contained in the current article that are also present in other articles about the same mutation.

For some embodiments, a user may initiate the operations 300, by interacting with GUI screen 500 by clicking on a "find annotations" button 510 included as part of the GUI interface to the annotation system. For some other embodiments, the request may be a message from an automated agent (not shown) requesting that the annotation server 140 find annotations for data objects a current document 405.

At step 320, for example, pattern matching engine 112 may parse the explicit data contained in the current document 405 to distill key terms, or identifying data, which may be annotated in other data sources. Typically, each key term, or identifying data, should itself be a data object capable of being annotated, that is, a candidate data object. In an alternative embodiment, annotation plug-ins integrated with specific applications 120₂-120ₙ may be configured to parse the explicit data in the current document 405 to derive a set of candidate data objects 410 and to provide the resulting set to the pattern matching engine 112. Typically, once it is created, pattern matching engine 112 uses the set of candidate data objects 410 to find annotations made for the same, or related, data objects in other annotatable data sources 117 contained in application data 115.

In one embodiment, the pattern matching engine 112 may generate the set of annotations 430 related to data objects in the current document 405 by retrieving the data object for each annotation 132 included in the index tables 134 and comparing the retrieved data object with the candidate data objects 410 to identify matching elements between them. In an alternative embodiment, the pattern matching 112 engine may use the term thesaurus 160 to determine whether any of the key terms, or related terms, exist in the term thesaurus. For some embodiments, each entry in the term thesaurus 160 may identify one or more annotations created for a data object stored in the application data that is related to the term. As described further below, entries in the term thesaurus 160 may be updated when users create new annotations or in a manner that may be configured using system administration tools 144.

For smaller volumes of data sources and/or annotations, comparing the explicit information in the data objects corresponding to each annotation 132 in the annotation store 132 may incur less overhead and computational expense than creating and maintaining the application thesaurus 160. On the other hand, as the volume of annotation records grows, searching each annotation record becomes more inefficient. As those skilled in the art understand, however, there are many possible programmatic embodiments and algorithms that will achieve the desired result of identifying annotations for a current document. Typically, the algorithm will include deriving a set of candidate data objects 410 from the current document to compare with a set of data objects for which annotations exist in the annotation store 130, and ultimately, a matching set of annotations 430, wherein each annotation included in the set was created for a data object that matches one or more of the candidate data objects 430 appearing in the current document 405.

In one embodiment, the system may allow users (e.g. a person or an application) to limit the scope of data sources searched by the pattern matching engine 115 to an identified set of search criteria. For example, a research scientist collaborating on a project may desire to find annotations for data objects in a current document 405 that exist in certain annotatable data sources 117 (e.g., annotations made for data objects in other research materials or research data) or only annotations created by users with certain roles within a collaboration group (e.g. a group scientists on a research team). In such an embodiment, a GUI interface may include controls 595 that allow the user to control the scope of application data 115 searched to identify matching annotated data objects.

Additionally, in some embodiments, the administrative tools 144 may be configured to allow a user (e.g., a system administrator) to limit the annotations identified in response to a request to find annotations based on users role and access privileges that may be stored in a security database 159. For example, the user may have been required to log on to the annotation system 111 and a set of user credentials (e.g., including the user's role, security level, associate user group, or the like) may have been retrieved from a security database 159 containing such user credentials. Filters based on a user's identity or membership in a group may be used to restrict access to annotations. Thus, some annotations, or portions thereof, may be hidden from some users (e.g., some annotation content may be visible only to managers).

In embodiments wherein the user comprises an automated agent configured to access the annotation system, subroutines or methods may be configured to request the pattern matching engine identify whether annotations exist for a current document based on the occurrence of certain predefined events. For example, application plug-ins $120_2$-$120_n$, may be configured to parse a document each time it is opened by a user to determine whether data objects are annotated in other data sources and to present a user with an indication that such annotations exist.

Returning to operations 300, in step 330, for each match identified by the pattern matching engine (i.e., for each data object (or related data object) that exists both in the current document 405 and in an annotated data object in another data source), the user may be presented with an indication that an annotation exits for a data object present in the current document 405. In one embodiment, GUI interface screen 500, may display an annotation icon (or icons in the case of multiple annotations) 580 to indicate to a user that annotations 132 exist for the data object marked by the icon. For example, in FIG. 5, the data object "Hsp70" 530 is shown with annotation icon 580 indicating that annotations exist for the data object, "Hsp70," in other data sources.

Figure 6:
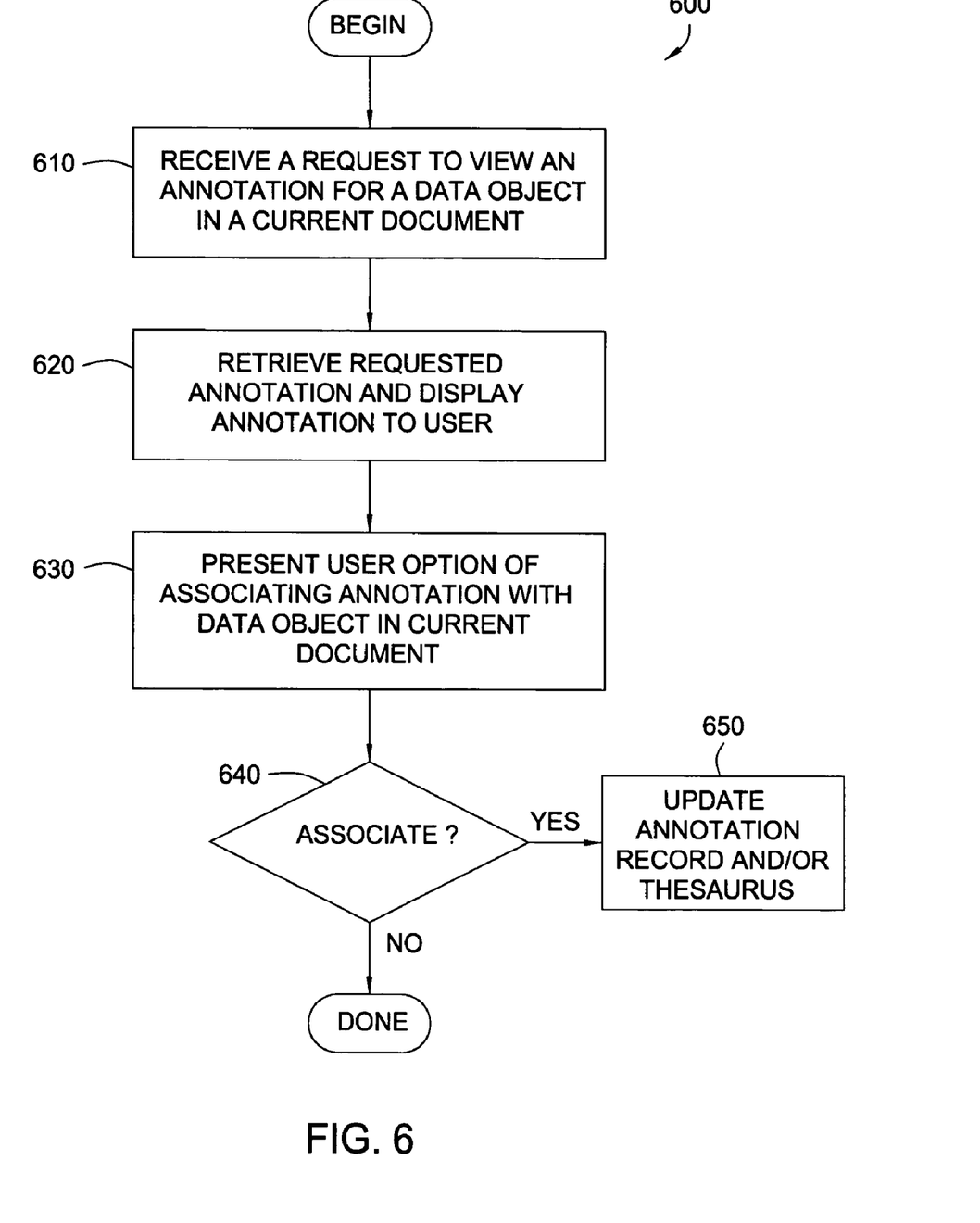
FIG. 6 is a flow chart illustrating exemplary operations for associating retrieved annotations with a data object in a current document, according to one embodiment of the present invention.

Retrieving Matching Annotations for Selective Association with Data Objects in a Current Document FIG. 6 illustrates exemplary operations 600 for retrieving annotations included in the set of matching annotations 430 and selectively associating them with data objects in a current document 405. The operations 600 begin at step 610, by receiving a request to view annotations for a data object in a current document 405. For example, a user may click the "find annotation" button 510 in GUI screen 500, and application plug-ins 120 and/or pattern matching engine 112 may carry out the operations 300 in response. An annotation icon 580 may then be displayed to a user to indicate which data objects in the current document have annotations available for retrieval and viewing. As illustrated, GUI screen 500 depicts a data source, such as a research article discussing a family of proteins.

In one embodiment, when a user desires to view an annotation identified as described above, the user may click on the annotation icon 580. At step 620 the annotation server 140 responds by retrieving the corresponding annotation 132 from the annotation store 130 and providing it to the application $120_{1-N}$ for display to the user. As shown in the GUI screen in FIG. 5, this may take the form of a dialog box 540 that presents the user with the retrieved annotation 590, and optionally, the data object 570 for which the annotation was originally created along with metadata about the annotation (e.g., the author of the retrieved annotation and the date it was created and the name and location of the data source).

At step 630, the user is provided with an option of associating the annotation with the corresponding data object in the current document. For example, after reviewing the retrieved annotation 540, the user may conclude that the annotation content describes a useful or interesting aspect or element of the data object. Associating the retrieved annotation 540 with the data object in the current document 405 propagates the tacit knowledge reflected in the annotation to the same, or related, data object appearing in multiple data sources stored by an enterprise system 100.

As illustrated in FIG. 5, for some embodiments, dialog box 540 may include an "associate annotation" button 550, or other suitable GUI control. When a user selects to associate a retrieved annotation (e.g., by clicking on button 550) with a data object in current document 405, the annotation server 140 may create a new annotation and store the new annotation in the annotation store 180. In another embodiment, the annotation server may update the index tables 134 associated with the retrieved annotation 590 to include a reference to the data object in the current document 405. Doing so allows a single index record to indicate each data object associated with an annotation. This saves the overhead required to duplicate the annotation each time it is associated with the same, or related, data object in an additional annotatable data source 117.

For some embodiments, if the retrieved annotation 590 is selected to be associated with the corresponding data object in the current document 405, at step 640, the annotation server 140 may update the annotation thesaurus 160 to include additional key terms appearing in the data object in the current document, update a corresponding annotation record to include a reference to the data object, and/or create a new annotation record with a reference to the data object.

CONCLUSION

Annotation pattern matching allows annotations created for a data object within one document to be accessed when viewing another document containing the same, or related, data object(s). Allowing users to identify annotations associated with data objects in a current document, therefore, allows the tacit knowledge captured in an annotation to propagate through an enterprise system.

While the foregoing is directed to specific embodiments of the present invention, other and further embodiments of the invention may be devised without departing from the basic scope thereof; the scope thereof is determined by the claims that follow.

What is claimed is:

1. A system for propagating annotations among related data objects present in discrete data sources in a network, comprising:

at least one processor;

an application, which, when executed by the at least one processor is configured to allow a user to access a first data source;

an annotation store containing annotations corresponding to data objects contained in a plurality of data sources;

a pattern matching engine, which, when executed by the at least one processor is configured to identify annotations created for data objects contained in data sources other than the first data source that are related to data objects contained in the first data source, and identify the annotations based on a thesaurus of related terms; and an interface, accessible from the application, configured to allow the user to selectively associate annotations identified by the pattern matching engine with data objects present in the first data source.

2. The system of claim 1, wherein the thesaurus of related terms comprises sets of related terms and an indication of a corresponding set of one or more annotations according to at least one of: a selection criteria, role or access authority of the user.

3. The system of claim 1, wherein the indication of the corresponding set of one or more annotations comprises, for each corresponding annotation, a data point identifying the location of a data object in a data source for which the corresponding annotation was created.

4. The system of claim 1, wherein the pattern matching engine is configured to exclude annotations from the identified annotations according to at least one of: a selection criteria, role or access authority of the user.

5. The system of claim 1, wherein the application is configured to display the first data source to the user via one or more graphical user interfaces that includes components to indicate to the user data objects in the first data source for which corresponding identified annotations exist in data sources other than the first data source.

\* \* \* \* \*